United States Patent [19]

Pate, III et al.

[11] Patent Number: 5,688,842
[45] Date of Patent: *Nov. 18, 1997

[54] PROCESS FOR PREPARING HIGH INTERNAL PHASE RATIO EMULSIONS AND LATEXES DERIVED THEREOF

[75] Inventors: James E. Pate, III, Sanford; Nanette E. Lutenske, Bay City; James Peters; Ronald R. Pelletier, both of Midland, all of Mich.

[73] Assignee: The Dow Chemical Company, Midland, Mich.

[*] Notice: The term of this patent shall not extend beyond the expiration date of Pat. No. 5,539,021.

[21] Appl. No.: 630,187

[22] Filed: Apr. 10, 1996

Related U.S. Application Data

[63] Continuation-in-part of Ser. No. 463,151, Jun. 5, 1995, Pat. No. 5,539,021.

[51] Int. Cl.$^6$ .................. C08J 3/02; B01J 13/00
[52] U.S. Cl. ............... 523/335; 252/310; 252/311; 252/312; 252/314; 524/801
[58] Field of Search .................. 252/308, 310, 252/311, 312, 314; 523/335; 524/801

[56] References Cited

U.S. PATENT DOCUMENTS

| | | | |
|---|---|---|---|
| 3,135,716 | 6/1964 | Uraneck et al. | 525/122 |
| 3,150,209 | 9/1964 | Short et al. | 525/194 |
| 3,360,599 | 12/1967 | Nyberg | 264/216 |
| 3,496,154 | 2/1970 | Wofford | 526/174 |
| 3,498,960 | 3/1970 | Wofford | 526/180 |
| 3,503,917 | 3/1970 | Burke, Jr. | 523/328 |
| 3,645,992 | 2/1972 | Elston | 526/169.2 |
| 3,946,994 | 3/1976 | Mertz et al. | 366/160.1 |
| 3,974,116 | 8/1976 | Lissant | 252/312 |
| 4,018,426 | 4/1977 | Mertz et al. | 366/160.3 |
| 4,123,403 | 10/1978 | Warner et al. | 523/313 |
| 4,145,298 | 3/1979 | Trepka | 252/51.5 |
| 4,155,873 | 5/1979 | Salazar et al. | 252/312 |
| 4,169,115 | 9/1979 | Tung et al. | 525/314 |
| 4,746,460 | 5/1988 | Taylor | 252/314 |
| 4,775,713 | 10/1988 | Homma et al. | 524/517 |
| 4,776,977 | 10/1988 | Taylor | 252/314 |
| 4,895,641 | 1/1990 | Briceno et al. | 208/286 |
| 5,037,864 | 8/1991 | Anand et al. | 523/348 |
| 5,120,765 | 6/1992 | Southwick et al. | 523/335 |
| 5,147,134 | 9/1992 | Bradley et al. | 366/150 |
| 5,250,576 | 10/1993 | DesMarais et al. | 524/804 |
| 5,272,236 | 12/1993 | Lai et al. | 526/348.5 |
| 5,278,272 | 1/1994 | Lai et al. | 526/348.5 |
| 5,399,293 | 3/1995 | Nunez et al. | 252/314 |
| 5,539,021 | 7/1996 | Pate et al. | 523/335 |

FOREIGN PATENT DOCUMENTS

| | | |
|---|---|---|
| 0 156 486 | 10/1985 | European Pat. Off. . |
| 283247 | 3/1988 | European Pat. Off. . |
| 0 283 247 | 9/1988 | European Pat. Off. . |
| 2 194 166 | 4/1987 | United Kingdom . |
| 2 194 166 | 3/1988 | United Kingdom . |

OTHER PUBLICATIONS

Ruckenstein, et al., *Phase Behavior and Stability of Concentrated Emulsions*, Journal Of Colloid and Interface Science, vol. 133, No. 2, Dec. 1989, pp. 432–441.

*Primary Examiner*—Peter A. Szekely
*Attorney, Agent, or Firm*—Reid S. Willis

[57] ABSTRACT

The present invention is a method of preparing a high internal phase ratio emulsion without phase inversion comprising the steps of:

a) continuously merging into a disperser and in the presence of an emulsifying and a stabilizing amount of a surfactant, a continuous phase liquid stream having a flow rate $R_1$, and a disperse phase liquid stream having a flow rate $R_2$; and b) mixing the merged streams with a sufficient amount of shear, and with $R_2:R_1$ sufficiently constant, to form the high internal phase ratio emulsion without phase inversion or stepwise distribution of an internal phase into an external phase;

wherein $R_2:R_1$ encompasses a range, the lower limit of which range being defined by a point where the volume average particle size of the high internal phase ratio emulsion begins to show an inverse dependence on $R_2:R_1$, and wherein the upper limit of which range is just less than an $R_2:R_1$ where a phase inversion of the high internal phase ratio emulsion takes place.

Monodisperse submicron particles can be prepared using the process of the present invention. Useful latexes can be prepared from these high internal phase ratio emulsions.

13 Claims, 4 Drawing Sheets

24% ENGAGE KC8852 in toluene, emulsified with sodium oleate

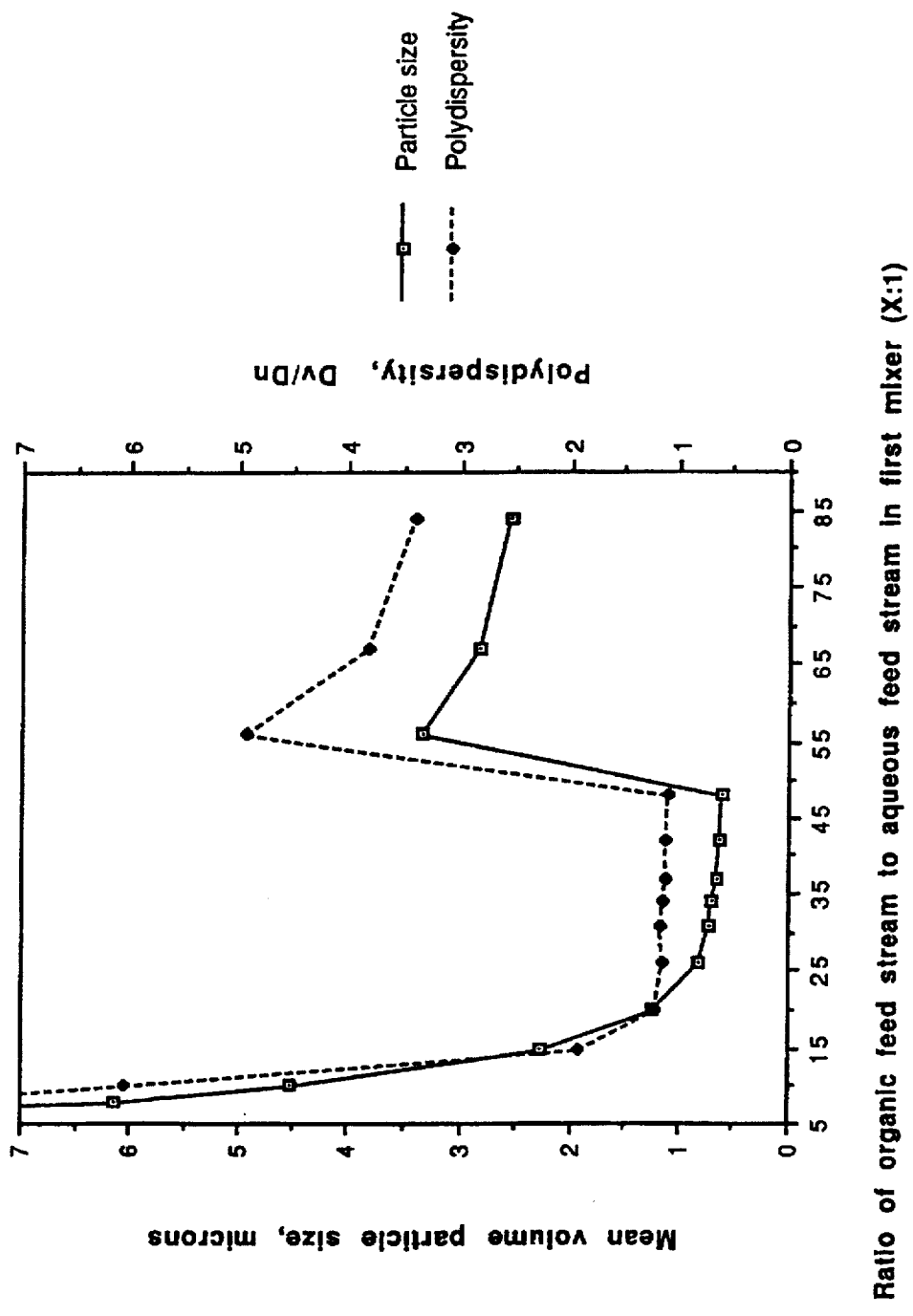

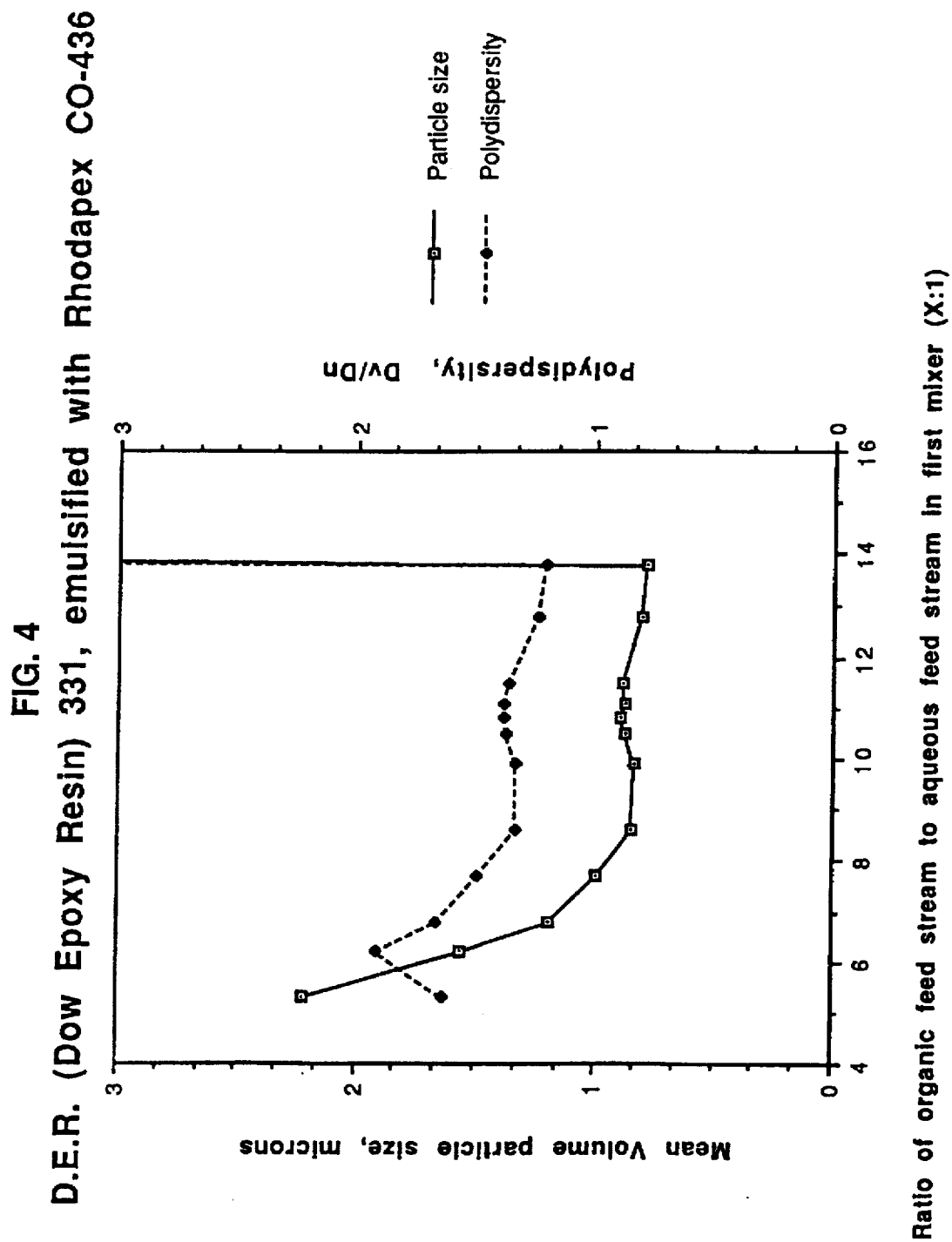

PROCESS FOR PREPARING HIGH INTERNAL PHASE RATIO EMULSIONS AND LATEXES DERIVED THEREOF

CROSS-REFERENCE TO RELATED APPLICATION

This application is a Continuation-in-Part of the application U.S. Ser. No. 08/463,151, filed Jun. 5, 1995, now U.S. Pat. No. 5,539,021.

BACKGROUND OF THE INVENTION

This invention relates to a process for preparing high internal phase ratio emulsions and artificial latexes derived therefrom.

In conventional emulsions, the dispersed phase contains spheres having a volume fraction of less than 0.74, which is the volume fraction of the most compact arrangement of spheres of equal radius. However, for high internal phase ratio (HIPR) emulsions, the dispersed phase may have a dispersed phase volume fraction as high as 0.99. The continuous phase in such cases forms a thin liquid film that separates polyhedral cells, and the HIPR emulsion is stabilized by the adsorption of surfactant from the continuous phase on the surface of the cells. These HIPR emulsions are known to be useful as precursors to high molecular weight polymers, composites, and membranes for separation systems. (See Ruckenstein et al., *J. Colloid Interface Science*, Vol. 133, No. 2, p. 432 (1989), incorporated herein by reference.)

The preparation of HIPR emulsions by a continuous process is known. For example, in U.S. Pat. 4,018,426 (incorporated herein by reference), Mertz et al. discloses a system for the continuous production of HIPR emulsions wherein two precisely metered immiscible phases (an internal phase and an inverter phase formed of an internal-in-external emulsifier and an external phase) are mixed together in a preselected ratio of internal phase to inverter phase of between 95 to 5 and 75 to 25 weight percent. The system provides a mixing means receiving the separate streams of the internal phase and the inverter phase and distributing loosely the internal phase in stepwise progression into the inverter phase. This stepwise progression is formed by positioning a plate containing a plurality of holes of progressively larger size which serve to distribute the internal phase stepwise in progressively greater total amount into the external phase before the resultant mixture reaches an outlet. Emulsions provided by the system disclosed by Mertz et al. are described as being useful in the pharmaceutical, food, cosmetic, and firefighting industries. It would be an advance in the art to provide a simple means of preparing HIPR emulsions.

The above-cited references do not suggest that HIPR emulsions can be used to prepare artificial latexes. Artificial latexes are conventionally prepared by the steps of: 1) providing a solution of a polymer or copolymer in a volatile organic solvent; 2) emulsifying the solution with water and an aqueous emulsifier; 3) removing the volatile organic solvent from the emulsion; and 4) adjusting the solids content if desired. Preparations of artificial latexes are described in U.S. Pat. Nos. 3,360,599; 3,503,917; 4,123,403; and 5,037,864, all incorporated herein by reference.

In the emulsification and water addition step of the preparation of the artificial latex by a phase inversion process, water and emulsifier are typically slowly added to a polymer solution with high shear until a prescribed ratio of water to polymer solution is reached, generally in the range from 1:10 to 4:1. Continuous processes are also known. For example, European Patent Application 0283247 A2 discloses a continuous method for dispersing a hydrophobic substance in water at elevated temperature and pressure to prepare an artificial latex having a particle size of less than 0.5 micron.

There remains a need to prepare monodisperse latexes having submicron particle size, especially in the field of coating applications, where controlled particle size, minimization of creaming, and improved latex stability are desirable.

SUMMARY OF THE INVENTION

The present invention is a method of preparing a high internal phase ratio emulsion without phase inversion comprising the steps of:

a) continuously merging into a disperser and in the presence of an emulsifying and a stabilizing amount of a surfactant, a continuous phase liquid stream having a flow rate $R_1$, and a disperse phase liquid stream having a flow rate $R_2$; and b) mixing the merged streams with a sufficient amount of shear, and with $R_2:R_1$ sufficiently constant, to form the high internal phase ratio emulsion without phase inversion or stepwise distribution of an internal phase into an external phase;

wherein $R_2:R_1$ is in a range where the polydispersity of the high internal phase ratio emulsion is not greater than about 3.

In a further aspect, the invention is a method of preparing a high internal phase ratio emulsion without phase inversion comprising the steps of:

a) continuously merging into a disperser and in the presence of an emulsifying and a stabilizing amount of a surfactant, a continuous phase liquid stream having a flow rate $R_1$, and a disperse phase liquid stream having a flow rate $R_2$; and b) mixing the merged streams at a mixing rate sufficiently constant to form the high internal phase ratio emulsion without phase inversion;

wherein $R_2:R_1$ encompasses a range, the lower limit of which range being defined by a point where the volume average particle size of the high internal phase ratio emulsion begins to show an inverse dependence on $R_2:R_1$, and wherein the upper limit of which range is just less than an $R_2:R_1$ where a phase inversion of the high internal phase ratio emulsion takes place, with the further proviso that the mean average particle size is not greater than 1.9 microns.

In another aspect, the present invention is a method of preparing a high internal phase ratio emulsion without phase inversion comprising the steps of:

a) continuously merging into a disperser and in the presence of an emulsifying and a stabilizing amount of a surfactant, an aqueous phase stream having a flow rate $R_1$, and a disperse phase liquid stream having a flow rate $R_2$; and b) mixing the merged streams at a mixing rate sufficiently constant to form the high internal phase ratio emulsion without phase inversion; wherein $R_2:R_1$ encompasses a range, the lower limit of which range being defined by a point where the volume average particle size of the high internal phase ratio emulsion begins to show an inverse dependence on $R_2:R_1$, and wherein the upper limit of which range is just less than an $R_2:R_1$ where a phase inversion of the high internal phase ratio emulsion takes place, and wherein the disperse phase comprises a polyolefin.

Monodisperse submicron particles can be prepared using the process of the present invention.

BRIEF DESCRIPTION OF THE DRAWINGS

FIG. 3 is a profile similar to FIG. 1, where the continuous phase is water, the disperse phase is STYRON™ 680 polystyrene (a trademark of The Dow Chemical Company, 40 weight percent in toluene based on the total weight of polymer and solvent) emulsified with 4 percent by weight Rhodapex™ C0-436 surfactant (a trademark of Rhône-Poulenc), based on the weight of the polystyrene.

FIG. 4 is a profile similar to FIG. 1, where the continuous phase is water, the disperse phase is D.E.R.™ 331 epoxy resin (a trademark of The Dow Chemical Company), and the surfactant is 4 percent by weight Rhodapex C0-436 surfactant, based on the weight of the epoxy resin.

DETAILED DESCRIPTION OF THE INVENTION

The HIPR emulsions of the present invention are prepared by continuously merging into a disperser and in the presence of an emulsifying and a stabilizing amount of a surfactant, a continuous phase liquid stream having a flow rate $R_1$, and a disperse phase liquid stream having a flow rate $R_2$; and mixing the merged streams at a mixing rate sufficient to form the HIPR emulsion. For the purposes of this invention, the term "continuous phase liquid stream" is used to denote a flowing liquid that becomes the continuous phase. Similarly, the term "disperse phase liquid" stream is used to denote a flowing liquid that becomes the disperse phase.

The continuous phase and disperse phase liquid streams are sufficiently immiscible with each other to be emulsifiable. In one aspect of the process of the present invention, $R_2:R_1$ is defined by a range where the polydispersity of the particles of the HIPR emulsion is not greater than about 3. For the purposes of this invention, the term "polydispersity" is used to denote the ratio of the volume average diameter and the number average diameter of the particles, or $D_v/D_n$. The term "particles" is used herein to denote particles or droplets.

Figure 1:
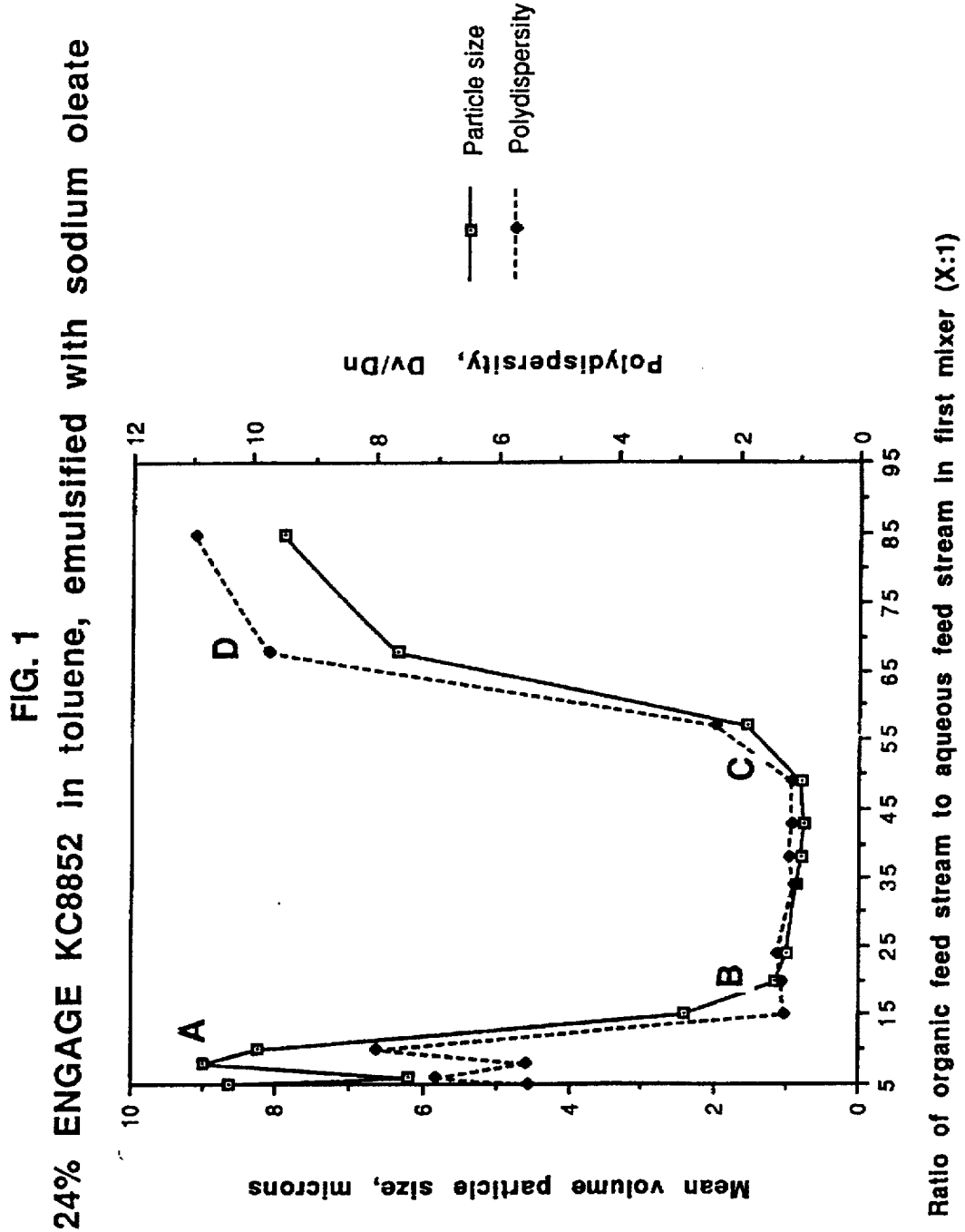
FIG. 1 is a profile of the particle size and polydispersity of particles of an HIPR emulsion prepared from the process of the present invention, as a function of the ratio of the rates of the disperse phase to the continuous phase, $R_2:R_1$, where the continuous phase is water, the disperse phase is ENGAGE™ KC8852 ethylene-octene elastomer (a trademark of The Dow Chemical Company, 24 weight percent in toluene based on the total weight of the copolymer and the solvent), and the surfactant is 4 percent by weight sodium oleate, based on the weight of the elastomer.

Referring to FIG. 1, point A on the graph represents the point where the volume average particle size of the HIPR emulsion begins to show an inverse dependence on $R_2:R_1$ until a virtual minimum, represented at point B, is reached. Point A represents the lower limit of $R_2:R_1$. The region encompassed by points A and B on the graph is where the mean volume average particle size and/or the polydispersity of the particles of the HIPR emulsion decrease with increasing $R_2:R_1$. At point B, a virtual minimum is reached, and from point B to point C, the particle size and polydispersity are substantially independent of $R_2:R_1$. This region represents the preferred operating range of $R_2:R_1$. At an $R_2:R_1$ greater than the $R_2:R_1$ at point C, a phase inversion takes place, as manifested by the rapid increase in particle size and polydispersity of the HIPR emulsion in the region from point C to point D. The preferred ratio of the disperse phase to the continuous phase for the example illustrated in FIG. 1 is from about 10:1, preferably from about 15:1, more preferably from about 20:1, to about 60:1, more preferably to about 55:1.

Figure 2:
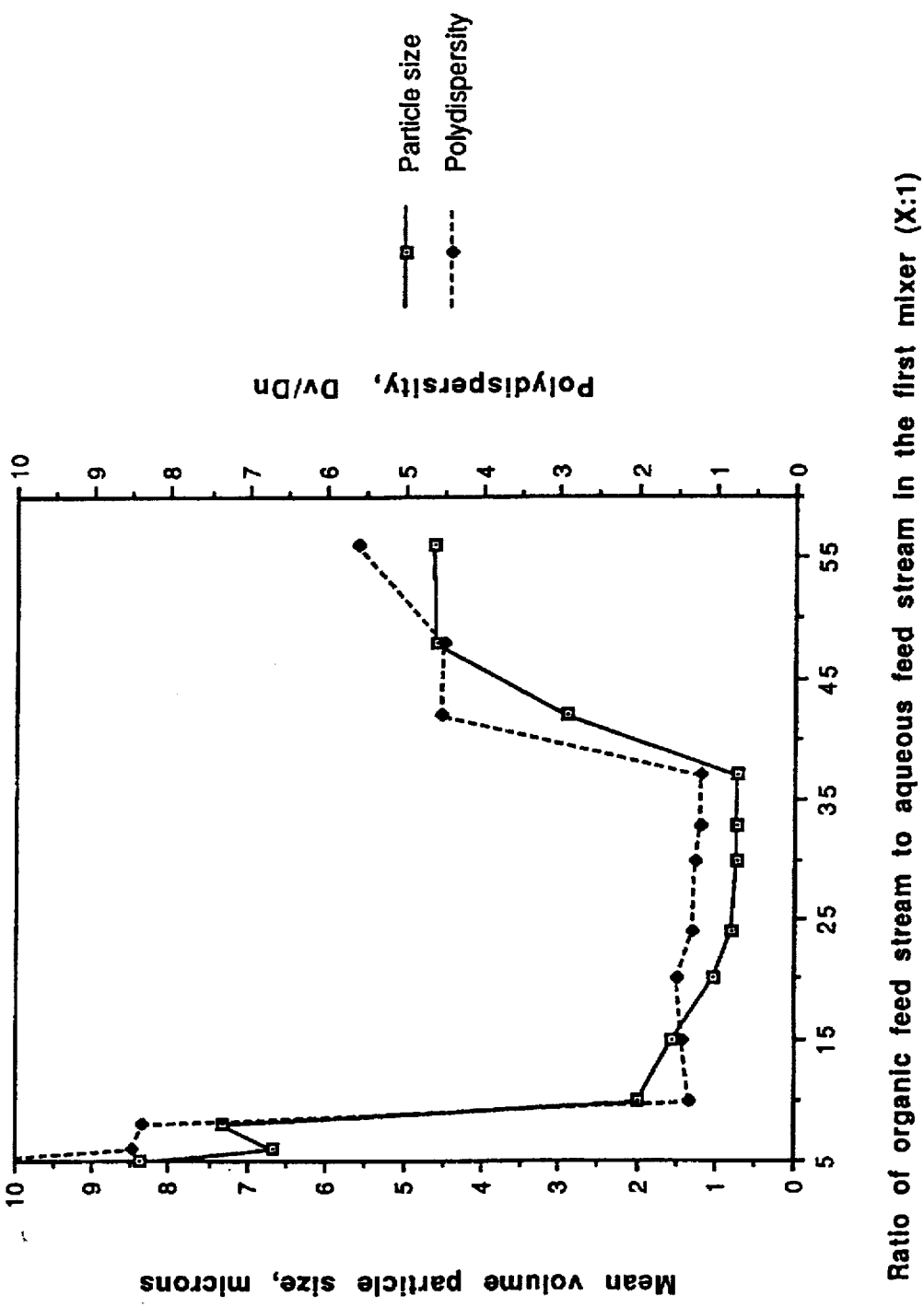
FIG. 2 is a profile similar to FIG. 1, where the continuous phase is water, the disperse phase is VECTOR™ 4211D SIS (styrene-isoprene-styrene) triblock copolymer (a trademark of Dexco Polymer, 35 weight percent in toluene based on the total weight of polymer and solvent), and the surfactant is 4 percent by weight Dresinate™ 214 potassium soap of a modified resin (a trademark of Hercules, Inc.), based on the weight of the copolymer.

Referring to FIG. 2, the preferred ratio of the disperse phase to the continuous phase is from about 10:1, more preferably 25:1, to about 40:1, more preferably to about 35:1.

Referring to FIG. 3, the preferred ratio of the disperse phase to the continuous phase is from about 15:1, preferably 25:1, to about 50:1.

Referring to FIG. 4, D.E.R.™ 331 epoxy resin (a trademark of The Dow Chemical Company) is used as the disperse phase in the absence of solvent for the resin. The preferred ratio of the disperse phase to the continuous phase is from about 6:1, preferably from about 8:1, to about 14:1, preferably about 13:1.

Surprisingly, HIPR emulsions are formed by the process of the present invention without phase inversion or stepwise distribution of an internal phase into an external phase. This process differs from previously described continuous processes for making HIPR emulsions, which processes are carried out with stepwise distribution resulting in phase inversion.

Preferably, $R_2:R_1$ is such that the polydispersity is not greater than about 2.0, more preferably, not greater than about 1.5, even more preferably, not greater than 1.2, and most preferably, not greater than about 1.1. The allowable variance of the rates of each stream depends, in part, on the nature of the disperse and continuous phases, and the dispersers used to make the HIPR emulsion. Preferably this variance is not greater than 10, more preferably not greater than 5, and most preferably not greater than 1 percent. Preferably, the average particle size of the HIPR emulsion is not greater than about 2 microns, more preferably, not greater than about 1.5 microns, and most preferably, not greater than about 1.0 micron.

The preferred ratio, $R_2:R_1$, depends upon several factors, including the composition of the phases, the type and quantity of the surfactant used to form and stabilize the HIPR emulsion, and the temperature at which the emulsion is formed.

The continuous phase and the disperse phase are liquids that are sufficiently immiscible to form a stable HIPR emulsion in the presence of a sufficient quantity of a surfactant. For the purposes of this specification, the term "liquid" is used to mean a homogeneous solution that can be pumped through a conduit. The liquid may be neat (that is, a liquid at room temperature), molten (that is, a liquid at a temperature above room temperature), or a solid or unpumpable liquid dissolved in a solvent.

Preferably, the continuous phase is aqueous and the disperse phase contains a polymer and optionally a solvent for the polymer. Suitable solvents include, but are not restricted to, toluene, cyclohexane, and methylene chloride. An example of a class of polymer suitable for the practice of the method of the present invention is a triblock copolymer containing a polymer block of an alkenyl aromatic hydrocarbon and a polymer block of a conjugated diene. Triblock copolymers are well known and can be prepared by any suitable means such as described in U.S. Pat. Nos. 3,135,716; 3,150,209; 3,496,154; 3,498,960; 4,145,298; and 4,169,115.

Examples of alkenyl aromatic hydrocarbons include alkyl-substituted styrenes; more preferred are styrene, α-methylstyrene, and vinyltoluene, with styrene being most preferred. Preferred conjugated dienes are $C_4$–$C_8$ conjugated dienes; more preferred are 1,3-butadiene, isoprene, 2,3-dimethyl-1,3-butadiene, 1,3-pentadiene, and 3-methyl-1,3-pentadiene; 1,3-butadiene and isoprene are most preferred.

Polyolefins such as polypropylene, polyethylene, and copolymers thereof and blends thereof, as well as ethylene-propylene-diene terpolymers, are also useful for the preparation of HIPR emulsions by the method of the present invention. Preferred olefinic polymers include linear high density polyethylene (HDPE); heterogeneously branched linear low density polyethylene (LLDPE) such as DOWLEX™ polyethylene resin (a trademark of the The Dow Chemical Company); heterogeneously branched ultra low linear density (ULDPE) such as ATTANE™ ULDPE (a trademark of the The Dow Chemical Company); homogeneously branched, linear ethylene/α-olefin copolymers such as TAFMER™ (a trademark of Mitsui PetroChemicals Company Limited) and EXACT™ (a trademark of Exxon Chemical Company), which can be prepared as described in U.S. Pat. No. 3,645,922, the disclosure of which is incorporated herein by reference; homogeneously branched, substantially linear ethylene/α-olefin polymers such as AFFINITY™ polyolefin plastomers and ENGAGE™ polyolefin elastomers (trademarks of the The Dow Chemical Company) which can be prepared, for example, by a process disclosed in U.S. Pat. Nos. 5,272,236 and 5,278,272, the disclosure of which process is incorporated herein by reference; and high pressure, free radical polymerized ethylene polymers and copolymers such as low density polyethylene (LDPE), ethylene-acrylic acid (EAA) copolymers such as PRIMACOR™ (a trademark of The Dow Chemical Company), and ethylene-vinyl acetate (EVA) copolymers such as ESCORENE™ polymers (a trademark of Exxon Chemical Company), and ELVAX™ (a trademark of E. I. du Pont de Nemours & Co.).

The preferred substantially linear ethylene/α-olefin polymers have a density (measured in accordance with ASTM D-792) of not less than about 0.850, more preferably not less than about 0.855, and most preferably not less than about 0.860 g/cm³ and not more than about 0.965, more preferably not more than about 0.880, and most preferably not more than about 0.875 g/cm³; a weight average molecular weight to number average molecular weight ratio ($M_w/M_n$) from about 1.5 to about 3.0, a measured melt index (measured in accordance with ASTM D-1238 (190/2.16)) of not less than about 0.1, more preferably not less than about 0.5, and most preferably not less than about 1 g/10 min, to not greater than about 500, more preferably not greater than about 100, even more preferably not greater than about 70, and most preferably not greater than 10 g/10 min; and an $I_{10}/I_2$ of about 6 to about 20, more preferably to about 14 (measured in accordance with ASTM D-1238 (190/10)).

Other examples of polymers that are suitable for the practice of the present invention include diblock copolymers of alkenyl aromatic hydrocarbons and conjugated dienes, such as those described herein; epoxy resins, polystyrenes, polyetherimides, polycarbonates, polyurethanes, and the like.

Naphthenic and paraffinic hydrocarbons are also suitable for the practice of the present invention.

HIPR emulsions can even be prepared using the process of the present invention in the absence of polymers. For example, solvents having low water-immiscibility such as toluene, methlyene chloride, cyclohexane, petroleum ethers and the like, can form HIPR emulsions with water. Furthermore, monomers such as styrene or acrylate monomers can be used.

The continuous and disperse phases are interchangeable. For example, a water stream and an oil stream merged and mixed together in the presence of a suitable surfactant at a water:oil flow rate ratio of 20:1 may produce an oil-continuous system. On the other hand, a water stream and an oil stream merged and mixed together in the presence of the same or another surfactant, preferably another surfactant, at a water to oil flow rate ratio of 1:20, may produce a water-continuous system. Although the continuous phase or the disperse phase is preferably water-based, and more preferably the continuous phase is water-based, neither phase need be water-based.

The viscosity of the phases is sufficiently low to be pumped through a conduit. Viscosities of the phases may be controlled, for example, by solvent addition or temperature adjustment. For example, a solid or an otherwise unpumpable polymeric disperse phase may be rendered pumpable by dissolving the polymer in a sufficient quantity of a solvent for the polymer. It may also be possible to render pumpable a solid or an otherwise unpumpable liquid by adjusting temperature.

The surfactant used to form the HIPR emulsion may be anionic, cationic, or nonionic, or combinations thereof. Generally, higher surfactant concentrations result in smaller diameter particles, but surfactant concentrations that are too high tend to deleteriously affect the properties of products, such as films, made from the emulsion. The surfactant concentration is sufficient to form an emulsion and subsequently stabilize it, and is preferably in the range of about 0.1, more preferably 0.5, and most preferably 2, to about 15, more preferably to about 6, and most preferably about 4 weight percent based on the weight of the disperse phase. The surfactant may be added initially to either the continuous phase or the disperse phase prior to mixing of the two phases, or added separately to the mixing device as a third stream. The surfactant is preferably added initially with the disperse phase prior to mixing of the two phases.

An example of a class of a suitable surfactant is a sulfate of an ethoxylated phenol represented by the formula:

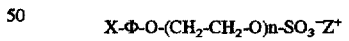

wherein X is a $C_6$–$C_{18}$ linear or branched alkyl group, preferably octyl, nonyl, or lauryl, more preferably octyl or nonyl, most preferably nonyl; Φ is phenylene, preferably p-phenylene; n is from 4 to 32, preferably from 4 to 12; and Z is sodium, potassium, or ammonium, preferably ammonium. Many of the preferred and more preferred sulfates of ethoxylated alkylphenols are commercially available, for example, poly(oxy-1,2-ethanediyl) α-sulfo-ω (nonylphenoxy) ammonium salt.

Other suitable classes of surfactants include, but are not restricted to, alkali metal fatty acid salts such as alkali metal oleates and stearates; polyoxyethylene nonionics; alkali metal lauryl sulfates, quaternary ammonium surfactants; alkali metal alkylbenzene sulfonates such as sodium dodecylbenzene sulfonate; and alkali metal soaps of modified resins.

Examples of dispersers suitable for the formation of the HIPR emulsion include, but are not restricted to, a rotating shaft within a sleeve-type disperser, as described by Warner et al. in U.S. Pat. No. 4,123,403, the teaching of which is incorporated herein by reference; a high-shear stator rotor; an extruder; or a centrifugal pump-head.

Latexes Prepared from HIPR Emulsions

A latex is prepared from an HIPR emulsion by combining the emulsion with a suitable amount of the liquid which constitutes the continuous phase liquid, or a liquid which is compatible with the continuous phase, but which does not interfere with the integrity of the particles. Where water is the continuous phase, the latex is typically prepared by adding water to the HIPR emulsion. More preferably, the latex is made in a continuous fashion by directing the HIPR emulsion and water through any suitable dilution unit, such as a centrifugal pump-head.

If the disperse phase of the HIPR emulsion is formed by dissolving a solid or viscous liquid in a suitable solvent, it is usually desirable to remove the solvent after the latex is formed. However, if the disperse phase does not contain a solvent, a latex can be formed by simply diluting the HIPR emulsion. In this case, the latex is formed much more efficiently than by conventional methods, because the steps of removing the solvent and readjusting the solids content are unnecessary.

It is also possible to prepare latexes having a multimodal distribution of particles by combining HIPR emulsions (or latexes prepared therefrom) of different mean average particle sizes. Latexes having multimodal distribution of particles are useful particularly when it is desired to increase the solids content of the latex, while maintaining low viscosity.

It is also possible to prepare latexes having a multitude of disperse phases.

It has been found that useful films can be made from latexes derived from the HIPR emulsions prepared by the process of the present invention. For example, a substantially linear olefin polymer as described herein is found to form a film having substantially uniform thickness across a substrate. This film has useful physical properties, such as a high tensile strength, and can be prepared at any temperature suitable for integral film formation, generally in the range from about 25° C., more preferably from about 50° C., to about 150° C., more preferably about 100° C.

The latexes derived from the HIPR emulsions prepared by the process of the present invention can be used for applications normally associated with latexes. For example, the latex may be used to coat floors, wood, cars, metals, fabrics, or paper; or applied to a mold to make a glove or a condom. The latex may also be used for adhesives, paints, sealants, caulks, or carpet backing.

The following example is for illustrative purposes only and is not meant to limit the scope of the invention.

Example 1 - Process for the Preparation of a Water-Continuous Dispersion

The ethylene-octene elastomer profiled in FIG. 1 is dissolved in toluene to make a 24 weight percent solution, based on the total weight of polymer and solvent. Sodium oleate (4 weight percent, based on the weight of the elastomer) is then added to the solution. This solution is the disperse phase. The disperse phase is pumped continuously through an arm of a 1.27 cm i.d. stainless steel tube fitted to a T, at a constant rate of 30 g/min. Concurrently, water (the continuous phase) is pumped through an arm of 0.318 cm stainless steel tubing fitted to the T, at a constant rate ranging from 6.0 g/min to 0.35 g/min. The two streams are merged and mixed together under conditions of shear using an IKA UTL 25 TURRAX™ in-line stator rotor mixer connected to the T using 1.27 cm stainless steel tubing, and operating at 7400 rpm. A useful HIPR emulsion is formed in the range where the ratio of disperse phase to continuous phase is about 10:1 to about 60:1 (i.e., where the flow rate of the water is constant in the range of 0.5 g/min to 3 g/min). The HIPR emulsion is diluted with water, and the particle size and polydispersity are measured using a Coulter LS 130 light scattering particle size analyzer. The toluene is removed from the resultant latex by rotary evaporation, and particle size and polydispersity are measured again, showing substantially the same results. The solids content is adjusted to 55 percent by the removal of water in vacuo.

What is claimed is:

1. A method of preparing a high internal phase ratio emulsion without phase inversion comprising the steps of:
    a) continuously merging into a disperser and in the presence of an emulsifying and a stabilizing amount of a surfactant, an aqueous phase stream having a flow rate $R_1$, and a disperse phase liquid stream having a flow rate $R_2$; and
    b) mixing the merged streams at a mixing rate sufficiently constant to form the high internal phase ratio emulsion without phase inversion;
  wherein $R_2:R_1$ encompasses a range, the lower limit of which range being defined by a point where the volume average particle size of the high internal phase ratio emulsion begins to show an inverse dependence on $R_2:R_1$, and wherein the upper limit of which range is just less than an $R_2:R_1$ where a phase inversion of the high internal phase ratio emulsion takes place, and wherein the disperse phase comprises a polyolefin.

2. The method of claim 1 wherein $R_2:R_1$ is in a range where the mean volume average particle size of the high internal phase ratio emulsion is not greater than about 1.9 microns.

3. The method of claim 1 wherein $R_2:R_1$ is in a range where the polydispersity is not greater than 3.

4. The method of claim 1 wherein the polyolefin comprises a substantially linear ethylene/α-olefin copolymer having a density from about 0.850 to about 0.965 g/cm$^3$, an $M_w/M_n$ from about 1.5 to about 3.0, a melt index of about 0.1 to about 100 g/10 min, and an $I_{10}/I_2$ of about 6 to about 20.

5. The method of claim 4 wherein the ethylene/α-olefin copolymer is an ethylene/1-octene copolymer having a density from about 0.855 to about 0.875, and a melt index from about 0.5 to about 70 g/10 min.

6. The method of claim 4 wherein $R_2:R_1$ is in the range of about 10:1 to about 60:1.

7. The method of claim 6 wherein $R_2:R_1$ is in the range of about 20:1 to about 55:1.

8. The method of claim 4 which further includes after step (b) the step of diluting the high internal phase ratio emulsion with water to form an artificial latex.

9. A method of preparing a high internal phase ratio emulsion without phase inversion comprising the steps of:
    a) continuously merging into a disperser and in the presence of an emulsifying and a stabilizing amount of a surfactant, a continuous phase liquid stream having a flow rate $R_1$, and a disperse phase liquid stream having a flow rate $R_2$; and
    b) mixing the merged streams with a sufficient amount of shear, and with $R_2:R_1$ sufficiently constant, to form the high internal phase ratio emulsion without phase inversion or stepwise distribution of an internal phase into an external phase;

wherein $R_2:R_1$ is in a range where the polydispersity of the high internal phase ratio emulsion is not greater than 3, or the mean average particle size is not greater than about 1.9 microns.

10. The method of claim 9 wherein the surfactant comprises a combination of surfactants selected from the group consisting of anionic, cationic, and nonionic surfactants.

11. The method of claim 9 wherein the mean average particle size is not greater than about 1.9 microns.

12. The method of claim 11 wherein the mean average particle size is not greater than about 1.5 microns.

13. The method of claim 12 wherein the mean average particle size is not greater than about 1.0 micron.

* * * * *